United States Patent [19]

Seyler et al.

[11] Patent Number: 4,658,481
[45] Date of Patent: Apr. 21, 1987

[54] SAFETY RELEASE PIN FOR FIRE EXTINGUISHERS

[75] Inventors: Gerard Seyler, Elgin; Donald R. Sloan, North Aurora, both of Ill.

[73] Assignee: Pittway Corporation, Aurora, Ill.

[21] Appl. No.: 819,719

[22] Filed: Jan. 17, 1986

[51] Int. Cl.⁴ .................. B65D 33/34; F16B 19/00
[52] U.S. Cl. ........................ 24/704; 24/298; 292/320; 292/307 R
[58] Field of Search ............... 24/704, 298, 16 PB; 292/307, 320, 322, 325, 327; 222/153

[56] References Cited

U.S. PATENT DOCUMENTS

| | | | |
|---|---|---|---|
| 1,964,013 | 6/1934 | Wenk | 292/320 |
| 3,367,701 | 2/1968 | Wenk, Jr. | 24/704 |
| 3,402,435 | 9/1968 | Merser | 24/298 |
| 3,600,027 | 8/1971 | Noland | 292/322 |
| 3,666,016 | 5/1972 | Estes | 292/307 R |
| 3,702,637 | 11/1972 | Bower | 292/307 R |
| 3,814,298 | 6/1974 | Hansen | 222/153 |
| 3,944,269 | 3/1976 | Lundberg | 292/307 R |
| 4,248,462 | 2/1981 | Choi | 292/322 |
| 4,299,417 | 11/1981 | McClure | 292/320 |
| 4,523,443 | 6/1985 | Momemers | 24/3 K |

Primary Examiner—Victor N. Sakran
Attorney, Agent, or Firm—Emrich & Dithmar

[57] ABSTRACT

A safety release pin for locking the operating mechanism of a fire extinguisher includes a shank having a longitudinal slot near one end defining parallel side walls, each formed with a vertical groove, which attach a nose portion to the end of the shank. An elongated locking member pivotally mounted to the shank overlying the slot defines a cam surface which coacts with surfaces of the operating mechanism as the pin is inserted to pivot the locking member into the slot to facilitate insertion, the locking member springs back to its locking position. When the pin is withdrawn, a detent surface of the locking member coacts with surfaces of the operating mechanism to deflect the nose portion downwardly tearing the side walls apart along the grooves, severing the nose portion from the shank.

13 Claims, 6 Drawing Figures

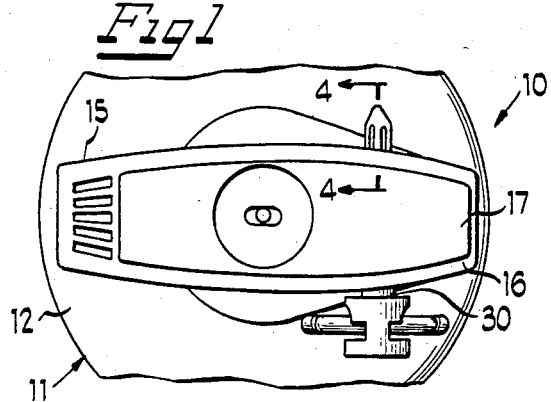
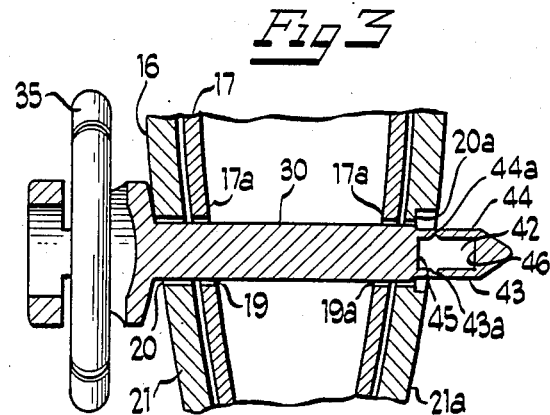
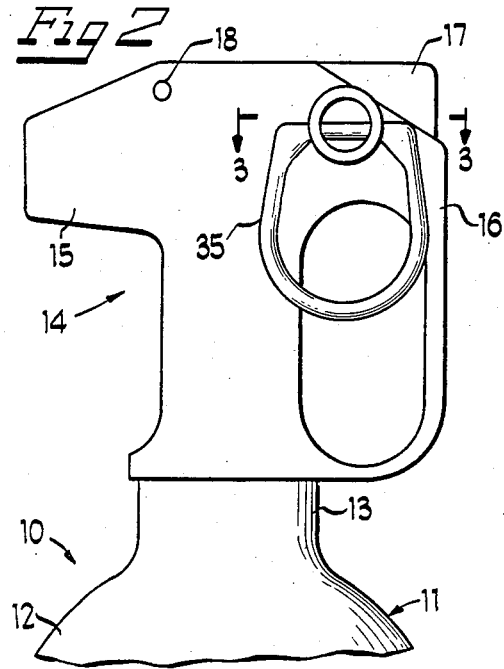
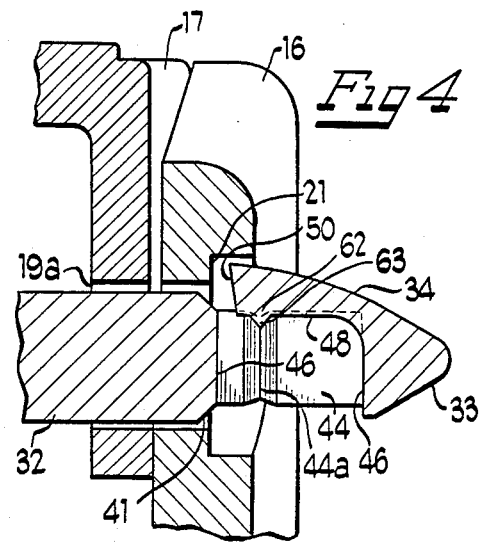
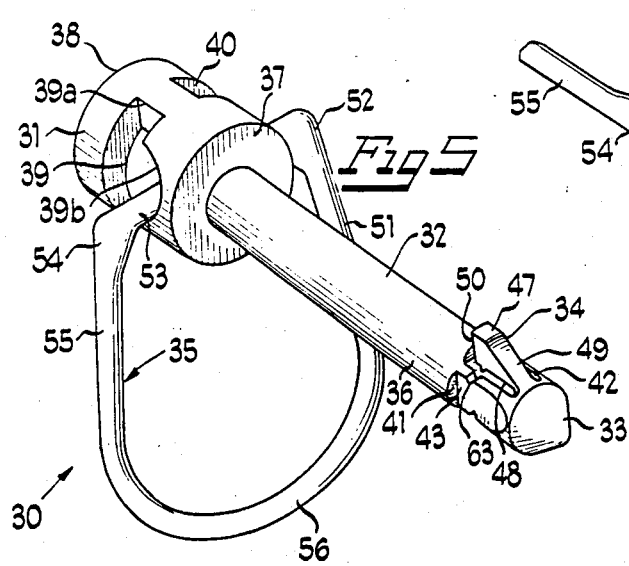
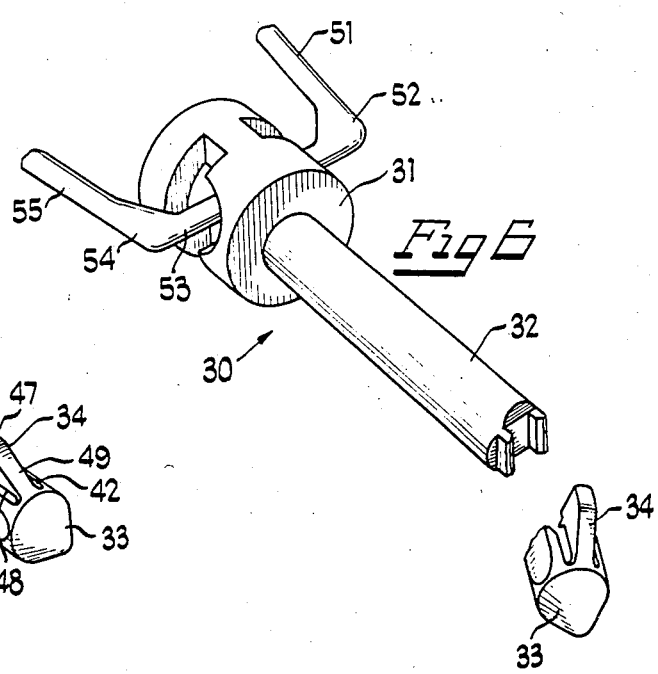

SAFETY RELEASE PIN FOR FIRE EXTINGUISHERS

BACKGROUND OF THE INVENTION

This invention relates to safety release pins for use with apparatus such as fire extinguishers and the like for preventing such apparatus from being operated until the pin is removed and for providing a visual indication as to whether or not the apparatus has been previously operated.

In U.S. Pat. No. 3,814,298 issued on June 4, 1974 to Arne Hansen, there is disclosed a safety release pin for use with apparatus such as a fire extinguisher, an insecticide sprayer and the like in which fluid or powder is confined and dispensed under pressure. The safety release pin is used to prevent accidental operation of the apparatus in that the release pin must be removed before the apparatus can be operated.

The release pin comprises a ring at one end and a locking structure at the other. The locking structure includes a pair of arms extending in a parallel spaced relationship, each having an outwardly projecting tab defining a cam surface. As the pin is inserted through openings in the fire extinguisher handle, the cam surfaces engage the peripheral edge of the openings, flexing the arms toward one another. After the tabs clear the openings in the fire extinguisher handle, the arms spring back to their locking position. When it is desired to use the fire extinguisher, the pin is pulled by the ring and fracture occurs at a weakened section of the arms at the rearward edge at least one of the cam surfaces, the tab breaks off at the weakened section of the arm. If both tabs break off, and if the pin is then inadvertently reinserted into the fire extinguisher handle, the lack of tabs on the pin will indicate that the apparatus has previously been operated.

In this safety release pin, the breaking mode for the tab is pure tension. Accordingly, only a small cross-sectional area can be used in the weakened section of the arms due to force breakaway limitations prescribed by Underwriters Laboratories for safety release pins of this type. Such constraint makes the arms vulnerable to breakage during normal handling.

Moreover, in some instances, only one of the two arms may break off as the pin is removed. With one arm intact, the pin could be inadvertently reinserted into the handle of the fire extinguisher and the remaining arm could conceal the fact that tampering or previous use has occurred.

SUMMARY OF THE INVENTION

It is a general object of the invention to provide an improved safety release pin.

Another object of the invention is to provide a safety release pin having an improved breakaway construction which resists breakage during normal handling but which readily tears apart upon intentional removal of the pin.

A further object of the invention is to provide an improved safety release pin of the breakaway type which provides a definite indication of tampering or previous removal of the pin from the apparatus with which it is used.

The present invention provides a safety release pin comprising, a head portion, a cylindrical shank, a nose portion, and a locking portion, said shank extending from said head portion with the free end of said shank terminating in said nose portion, said shank having a portion of reduced diameter rearwardly of said nose portion including a pair of flat surfaces extending axially of said shank, and at least one of said surfaces having a groove extending normal to the axis of said shank, said locking portion including an elongated locking member formed integrally with said shank rearwardly of said nose portion, said locking member defining a detent surfaces which extends generally normal to the axis of said shank whereby a force in a direction axially of said shank applied to said detent surfaces and translated to said nose portion through said locking member tends to rotate said nose portion about an axis extending parallel to said detent surface and normal to the axis of said groove.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a fragmentary top plan view of a fire extinguisher incorporating a dispensing apparatus, and including a safety release pin provided in accordance with and embodying the features of the present invention for preventing inadvertent operation of the dispensing apparatus;

FIG. 2 is a fragmentary side elevation view of the fire extinguisher including the safety release pin of the present invention;

FIG. 3 is a view in horizontal section taken along the line 3—3 of FIG. 2;

FIG. 4 is a view in vertical section taken along the line 4—4 of FIG. 1;

FIG. 5 is a perspective view of the safety release pin provided by the invention; and FIG. 6 is a perspective view of the safety release pin showing the nose portion broken off.

DESCRIPTION OF THE PREFERRED EMBODIMENT

The safety release pin of the present invention is described with reference to an application for preventing inadvertent operation of a fire extinguisher by locking the operating mechanism of the fire extinguisher. With reference to FIGS. 1-4 of the drawings, there is illustrated, a fire extinguisher, generally designated by the numeral 10, including a container 11 for holding fire extinguishing material under pressure. The fire extinguisher 10 may be of the type disclosed in the copending application Ser. No. 675,630 of Gerard Seyler et al. entitled Fire Extinguisher Valve with Pressure Indicator. Preferably, the fire extinguishing material is a dry chemical extinguisher comprising a dry powder and a pressurized impelling gas for expelling the powder from the container. However, it will be appreciated that the locking pin of the present invention could be used with other types of fire extinguishers or other types of dispensing apparatus.

The container 11 includes a bottle-shaped shell 12 having an internally threaded neck 13 at one end thereof defining a circular outlet opening, upon which is mounted a dispenser assembly 14. The dispenser assembly 14 includes a nozzle 15 which is integral therewith and projects laterally therefrom and has a nozzle bore (not shown) which communicates with the interior of the shell 12 through a passageway. A valve assembly (not shown) is located within the passageway and is normally closed to block the flow of extinguishing material to the nozzle 15.

A fixed handle 16 projects laterally from the side of the dispenser assembly 14. An actuating lever 17 for the valve has one end thereof pivotally connected to the dispenser assembly 14 by a pin 18 for pivotal movement between a normal rest position, illustrated in FIG. 2, and an actuating position in which the actuating lever 17 operates the valve. Formed through surfaces 17a of the actuating lever 17 adjacent to the distal end thereof are an apertures 19 and 19a which are adapted for coaxial alignment with like apertures 20 and 20a formed through surfaces 21 and 21a of the fixed handle 16 for receiving the safety release pin 30 for holding the actuating lever 17 at its normal rest position and preventing movement thereof to the actuating position.

Referring to FIG. 5, the safety release pin 30 includes a head portion 31, a shank 32, a nose portion 33, locking portion 34 and a pull ring 35. The safety release pin 30 is preferably molded from a suitable plastic material which has good strength characteristics but yet is also somewhat brittle. The shank 32, which is generally cylindrical, extends from the head portion 31 with the free end 36 of the shank 32 terminating in the nose portion 33. The safety release pin 30 including the pull ring 35 is molded as one assembly.

The head portion 31 comprises a hollow cylinder having a closed end 37 and an open end 38 and a pair of opposing circumferentially extending apertures 39 and 40 formed in its side walls. Each aperture, such as aperture 39 includes a generally rectangular slot portion 39a and a semi-circular portion 39b.

The free end 36 of the shank 32 has a portion 41 of reduced diameter with a longitudinal slot 42 formed therethrough defining a pair of side walls 43 and 44, and a pair of end walls 45 and 46. Each of the side walls 43 and 44 has a respective groove 43a and 44a extending normal to the axis of the shank 32.

The locking portion 34, which has a generally trapezoidal longitudinal cross section, has a top 47, a base 48 and sides 49 and 50.

The pull ring 35 includes five generally straight segments 51-55 and an arcuate segment 56, the segments being formed integrally in end-to-end relation to provide a loop with a flat segment 53 extending through the apertures 39 and 40 in the head portion 31 and the arcuate segment 56 defining a semi-circular gripping portion.

Considering the free end 36 of the shank in more detail, with reference to FIGS. 3-5, the side walls 43 and 44 extend in parallel spaced relation from the free end 36 of the shank 32 and are integrally connected to the end walls 45 and 46 which defines a rigid structure for the side walls. The locking portion 34 extends axially of the shank 32 overlying the slot 42 with a fixed end 61 formed integrally with the shank 32 defining a pivot axis for the locking portion 34 which has its free end 62 projecting toward the forward end wall 46.

Side 49 of the locking portion 34 slopes downwardly from the top 47 to the base 48 defining a cam surface. The side 49 coacts with the peripheral surface of apertures 19 and 19a and 20 and 20a through actuating lever 17 and fixed handle 16 to pivot the outwardly projecting locking portion 34 counterclockwise about its pivot axis into the slot 42, during insertion of the safety release pin 30 into the aligned apertures of the dispenser assembly 14 to facilitate insertion of the safety release pin. When the safety release pin 30 is pushed all the way into position with the free end 36 of the safety release pin 30 extending beyond aperture 20a, locking portion 34 springs back to its normal portion. The other side 50 defines a detent surface which maintains the safety relese pin 30 in place.

The detent surface extends generally normal to the axis of the shank 32. In one safety release pin constructed, the side 50, or detent surface, extended at an angle of approximately ten degrees relative to a vertical axis. Thus, as the safety release pin 30 is withdrawn, side 50 engages surface 21a whereby a force in a direction axially of the shank 32 is applied to the side 50, or detent surface. The force is translated to the nose portion 33 through the locking member. Such force, and a force on shank 32 operating in the opposite direction from a couple which tends to rotate the nose portion about an axis extending parallel to the detent surface and normal to the axis of the groove. Thus, in effect, parallel forces are applied to the top surfaces of the side walls 43 and 44 on the nose portion side of the grooves.

Referring to FIG. 3, the grooves 43a and 44a in the side walls 43 and 44 define fracture lines at the free end 36 of the safety release pin 30. The safety release pin 30 is thus designed to tear apart in two locations upon removal of the pin 30, causing the complete nose portion 33 to break away from the shank 32 as shown in FIG. 6.

Referring to FIGS. 4 and 6, the side walls 43 and 44 define a portion of reduced diameter for the shank 32. The locking portion 34, which has its base 48 extending substantially coplanar with the upper surfaces of the side walls 43 and 44, is thus located with its upper half extending a distance greater than the diameter of the shank 32. In one construction for the safety release pin 30, the shank 32 had a diameter of 0.170 inches and the height of the side walls 43 and 44 were 0.150 inches and the thickness of each side wall was 0.035 inches. The depth of each groove 43a and 44a was 0.012 inches. To enhance breakaway, notches 63 may be provided at the top edge and/or bottom edge of the side walls at the location of the grooves 43 and 44a.

Referring to FIGS. 1-3, to insert the safety release pin 30, the apertures 20, 20a and 19, 19a in the fixed handle 16 and the actuating lever 17, respectively, of the dispenser assembly 14 are aligned and the nose portion 33 of the safety release pin is pushed through one of the pairs of aligned apertures. As the free end 36 of the safety release pin 30 passes through the apertures, the side 49 or cam surface engages peripheral surfaces of the aperture 20 in the fixed handle 16 and locking portion 34 is pivoted downward into the slot 42. The locking portion 34 remains pivoted as it passes through the aligned apertures 20 and 19 and 19a, 20a on each side of the fixed handle and as the nose portion 33 is pushed through the last aperture 20a, the cam surface springs back to its normal position (FIG. 4) with the detent surface defined by side 50 aligned with the surface 21 adjacent to aperture 20a in fixed handle 16. Thus, the safety release pin 30 cannot be drawn out of the dispensing mechanism without breaking because detent surface defined by the generally vertical extending side 50 of the locking member 34 will engage the surface 21 adjacent to the aperture 20a.

When it is desired to use the fire extinguisher 10, the safety release pin 30 is pulled causing the generally vertical side 50 or detent surface to engage the surface 21 adjacent to the aperture 20a. Then, with continued pulling of the safety release pin 30, the force couple tends to rotate the nose portion 33 of the safety release pin 30 about an axis generally parallel to the detent surface and normal to the axis of the grooves 43a and 44a, applying a force to the reduced portion of the shank 32. Consequently, the pin 30 tears apart at the two fracture locations defined by grooves 43a and 44a so that the nose portion 33 completely breaks off as illustrated in FIG. 6. After the safety release pin 30 has been removed, the user can operate the actuating lever 17, depressing the lever to the actuating position for operating the valve to its open condition to permit the flow of extinguishing material from the container 11 outwardly through the nozzle 15.

We claim:

1. A safety release pin comprising a head portion, a cylindrical shank, a nose portion, and a locking portion, said shank extending from said head portion with the free end of said shank terminating in said nose portion, said shank having a portion of reduced diameter rearwardly of said nose portion including a pair of flat surfaces extending axially of said shank, at least one of said surfaces having a groove extending normal to the axis of said shank, said locking portion including an elongated locking member formed integrally with said shank rearwardly of said nose portion, said locking member defining a detent surface which extends generally normal to the axis of said shank whereby a force in a direction axially of said shank applied to said detent surface and translated to said nose portion through said locking member tends to rotate said nose portion about an axis extending parallel to said detent surface and normal to the axis of said groove, said locking member overlying said slot and having a fixed end and a free end, said fixed end being formed integrally with said shank near said end wall defining a pivot axis for said locking member, said locking member defining a cam surface which slopes downwardly from its free end towards its fixed end for receiving a force for pivoting said locking member about its pivot axis at least partially into said slot.

2. A safety release pin according to claim 1, wherein said detent surface is defined at said free end of said locking member.

3. A safety release pin according to claim 2, wherein said locking member has a generally trapezoidal longitudinal cross section including a base, a top, a first side sloping downwardly from said top to said base defining said cam surface, and a second side from said top to said base, defining said detent surface.

4. A safety release pin comprising, a head portion, a shank, a nose portion, and a locking portion, said shank extending from said head portion with the free end of said shank terminating in said nose portion, said shank having a longitudinal slot formed therethrough rearwardly of said nose portion defining first and second opposing generally parallel side walls and first and second end walls interconnecting said side walls, each of said side walls having a groove extending normal to the axis of said shank, said locking portion including an elongated locking member having a fixed end and a free end, said locking member extending axially of said shank overlying said slot with its fixed end formed integrally with said shank near said first end wall rearwardly of said nose portion defining a pivot axis for said locking member and with its free end projecting toward said second end wall, said free end of said locking member defining a detent surface which extends generally normal to the axis of said shank whereby a force in a direction axially of said shank applied to said detent surface and translated to said nose portion through said locking member tends to rotate said nose portion about an axis extending parallel to said detent surface and normal to the axis of said grooves in said side walls.

5. A safety release pin according to claim 4, wherein said locking member defines a cam surface which slopes downwardly from its free end towards its fixed end for receiving a force for pivoting said locking member about its pivot axis at least partially into said slot.

6. A safety release pin according to claim 5, wherein said locking member has a generally trapezoidal longitudinal cross section including a base, a top, a first side sloping downwardly from said top to said base defining said cam surface, and a second side extending from said top to said base defining said detent surface.

7. A safety release pin according to claim 6, wherein said second side of said locking member is inclined at an angle of approximately ten degrees.

8. A safety release pin for use with apparatus for preventing inadvertent operation of the apparatus, the apparatus including an operating member movable from a first position to a second position for operating the apparatus, said operating member including an aperture through a surface thereof which is aligned with a further aperture in a surface of the apparatus when the operating member is in said first position to receive said safety release pin allowing said safety release pin to lock said apparatus in an unoperated condition, said safety release pin comprising, a head portion, a cylindrical shank, a nose portion, and a locking portion, said shank extending from said head portion with the free end of said shank terminating in said nose portion, said shank having a portion of reduced diameter rearwardly of said nose portion including a pair of flat surfaces extending axially of said shank, at least one of said surfaces having a groove extending normal to the axis of said shank, said locking portion including an elongated locking member formed integrally with said shank rearwardly of said nose portion, said locking portion including a cam surface which coacts with a first one of the apertured surfaces during insertion of the pin into the apparatus to pivot said locking member downward toward said reduced portion of said shank to facilitate insertion of the pin into the apparatus, and said locking member defining a detent surface which extends generally normal to the axis of said shank, whereby as the pin is withdrawn from the apparatus, said detent surface coacts with a second one of said apertured surfaces to apply a force in a direction axially of said shank which force is translated to said nose portion through said locking member tending to rotate said nose portion about an axis extending parallel to said detent surface and normal to the axis of said groove thereby applying a force to said reduced portion of said shank, tearing said shank apart along said groove in said flat surface thereof, thereby severing said nose portion from said shank.

9. A safety release pin according to claim 8, wherein said reduced portion of said shank defines first and second parallel flat surfaces which extend in opposing relationship, each having a groove extending normal to the axis of said shank.

10. A safety release pin according to claim 8, wherein said reduced portion of said shank defines first and second parallel side walls extending longitudinally of said shank near the free end thereof, spaced apart defining a slot therebetween, each side wall having a groove extending normal to the axis of said shank, the rearward surface of said nose portion defining an end wall interconnecting said side walls, and said locking member being formed integrally with said shank near said end wall.

11. A safety release pin according to claim 10, wherein said locking member overlies said slot and has a fixed end and a free end, said fixed end being formed integrally with said shank near said end wall defining a pivot axis for said locking member, said locking member defining a cam surface which slopes downwardly from its free end towards its fixed end which coacts with said first apertured surface for pivoting said locking member about its pivot axis at least partially into said slot during insertion of the pin into the apparatus.

12. A safety release pin according to claim 11, wherein said locking member has a generally trapezoidal longitudinal cross section including a base, a top, a first side sloping downwardly from said top to said base defining said cam surface, and a second side from said top to said base, defining said detent surface.

13. A safety release pin according to claim 11, wherein said head portion includes a generally cylindrical extension of said shank having a transverse slot therethrough, and a pull ring extending through said slot.

* * * * *